UNITED STATES PATENT OFFICE.

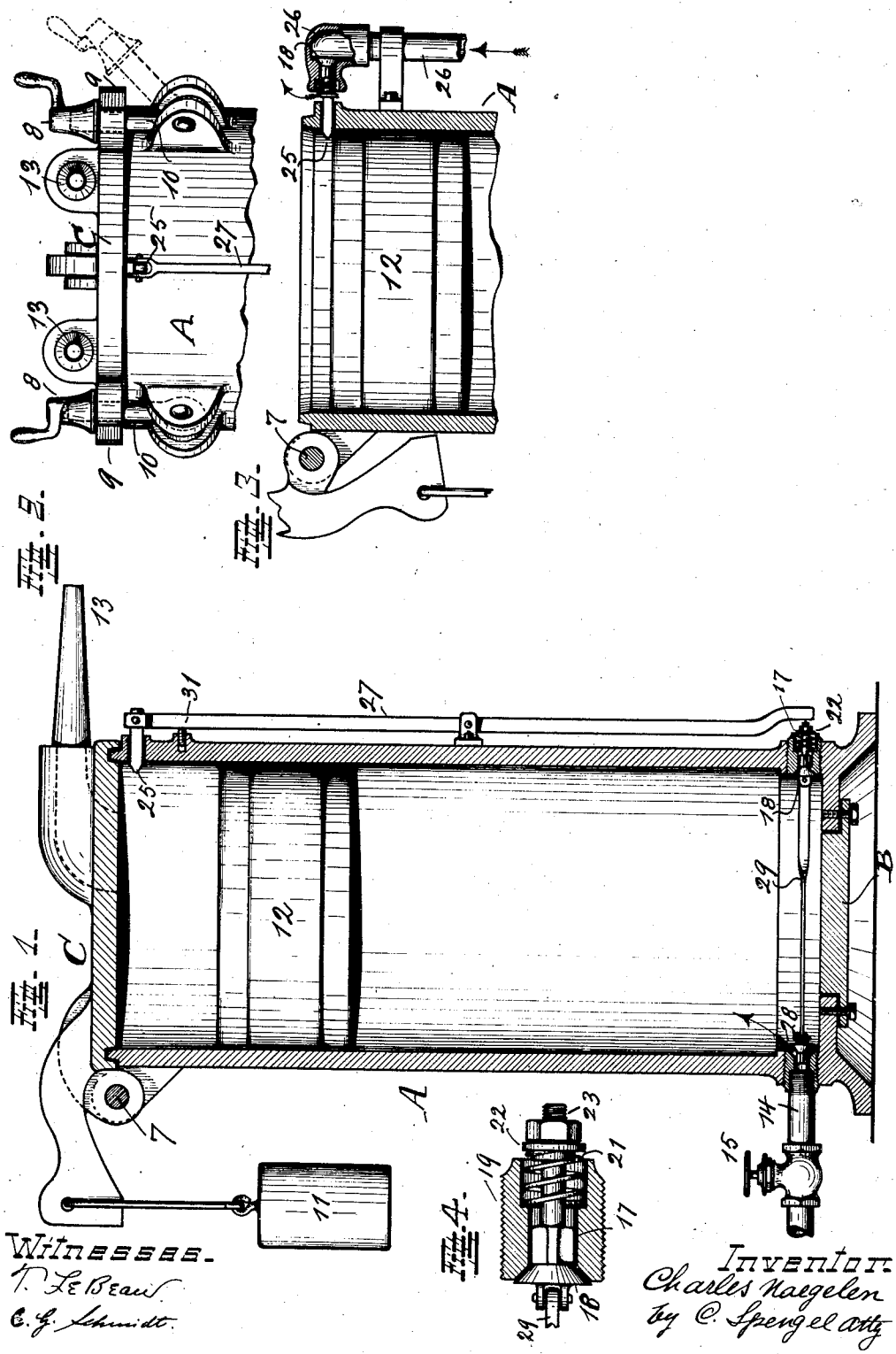

CHARLES NAEGELEN, OF CINCINNATI, OHIO, ASSIGNOR TO THE CINCINNATI BUTCHERS' SUPPLY COMPANY, OF CINCINNATI, OHIO, A CORPORATION OF OHIO.

SAFETY APPLIANCE FOR SAUSAGE-STUFFERS.

1,062,989.  Specification of Letters Patent.  Patented May 27, 1913.

Application filed April 24, 1912. Serial No. 692,956.

*To all whom it may concern:*

Be it known that I, CHARLES NAEGELEN, a citizen of the United States, and a resident of Cincinnati, Hamilton county, State of Ohio, have invented a certain new and useful Safety Appliance for Sausage-Stuffers; and I do declare the following to be a clear, full, and exact description of the invention, attention being called to the drawing which accompanies this application and forms a part thereof.

This invention concerns devices in which a movable machine-element like a press-head is used to form plastic matter into a certain shape, by forcing the same through a correspondingly shaped orifice whereby the desired formation is imparted. Sausage stuffers operate in this manner and my invention is described in connection with a device of this kind. They consist of a cylindrical inclosure which may be charged with meat-dough and contains a movably fitted press-head adapted, when moving toward an outlet orifice of proper shape provided in the inclosure, to expel the dough therethrough and into sausage-casings provided in communication therewith. Fluid pressure, which may be air or water, is used to move these press-heads, also steam, if not otherwise objectionable. This fluid is admitted to the inclosure at one of its ends and against one side of the press-head so as to cause the same to move against the matter on its other side, whereby this matter is forced out of the outlet-orifice in the other end toward which the press-head is moving. After a charge has been expelled, the press-head is returned to its first position and the inclosure may be re-filled. This is done through an opening provided with a removable closure, which latter is securely connected in position before the press-head is permitted to act.

Accidents caused by forcible ejection of the press-head have occurred and are liable to happen in consequence of premature admission of the medium which moves the press-head and before the cover was secured in position, or by the untimely opening of this latter before the pressure was shut off.

My invention consists of a safety-device adapted to be applied to machines of this kind and intended to prevent accidents of the character mentioned.

In the following specification and particularly pointed out in the claims at the end thereof, will be found a full description of my invention, together with its operation, parts and construction, which latter is also illustrated in the accompanying drawing, in which:—

Figure 1, shows my invention applied to a sausage-stuffer, a machine of this kind being shown in a vertical section. Fig. 2, shows in elevation the upper part of such a stuffer. Fig. 3, shows in a view similar to the upper part of Fig. 1, my invention in modified form. Fig. 4, shows in an enlarged view a valve used in connection with my invention.

In the drawing, A indicates the wall of the inclosure of the stuffer and B is the bottom of the same. Access to the inclosure for charging it is had through the top which for such purpose is left open but provided with a cover C, for closing the same. This cover is hinged at 7, and may be held tight to its seat, by clamping-nuts 8, when they are screwed down upon lugs 9, on said cover, said clamping nuts being carried on tie-rods 10, pivotally connected to the wall of the inclosure. To release the cover these clamping nuts are eased and dropped down from the cover as indicated in dotted lines in Fig. 2.

11 is a weight to counterbalance the cover and to facilitate its manipulation.

12, is a press-head, movably fitted into the inclosure and adapted to move therein from one end to the other, in this case from the bottom to the top. The outlet is in the cover and terminates in a discharge nozzle 13, adapted to permit connection of sausage-casings to be filled. One such outlet may be provided, or two of them as shown. Air under pressure is the medium presumed to be used in this case, it being admitted through a pipe 14, controlled by a valve 15. In using such an apparatus, the cover is raised and the inclosure is filled with meat dough, the press-head being at the bottom. Next the cover is closed down and locked and air under pressure is admitted below the press-head, whereby this latter is caused to rise thereby forcing the dough out of the discharge nozzles. The outlet openings of these latter are shaped in a manner to cause the dough, while leaving them, to assume the desired shape and condition most suitable for the sausage-casings to be filled. The inclosure becomes empty with the arrival of the press-head immediately under the cover. Thereupon the air is shut off which permits the press-head to drop to the bottom, leaving the inclosure in a condition for re-charging. Accidents are liable to occur at this time as for instance by unlocking the cover before the air is turned off, or by the inadvertent turning on of the air before the cover is locked, or while the same is open. To prevent such accidents I provide an independent port 17 in the inclosure and open to the atmosphere, a valve 18, to control passage through it, and means whereby this valve is operatively connected to the press-head and in a manner that any movement of this latter, beyond the upper edge of the inclosure, will cause the valve to open relieving thereby the air-pressure below the press-head by permitting air to escape through port 17. Thus a force which might expel the press-head from its inclosure and possibly hurl it into the air with disastrous results is instantly removed. To facilitate construction and manufacture, this port together with the seat for its valve is contained in a plug 19, (observe Fig. 5), which is seated in wall A of the inclosure, as shown in Figs. 1 and 4. A spring 21, by bearing against a collar 22, on stem 23 of the valve, serves to hold this latter normally to its seat.

The means whereby the press-head, at the end of its stroke, acts upon valve 18, to relieve the pressure, consist of a trip 25 seated in the side of the inclosure below the upper edge thereof and adapted, when actuated by the press-heads, to open the valve. As shown in Fig. 3, the trip acts directly upon valve 18 by pushing the same open, that is inwardly with reference to a vent-pipe 26, which is in open communication with the lower part of the inclosure, at a point where plug 19 is shown in Figs. 1 and 4. As shown in Fig. 1, it acts upon the valve by means of a lever 27, pivotally supported outside of the inclosure. The action in this case may be extended by providing an additional valve 28, adapted to choke off the air-admission at the same time, said valve being connected to valve 18 by means of a link 29. Thus in this case the action does not merely relieve the pressure but also cuts off the supply.

31 is a screw to adjust the position of the trip shown in Fig. 1. As will be seen, the action is entirely automatic and the relief valve requires no attention whatsoever inasmuch as it closes automatically as soon as the press-head recedes from its raised position.

Having described my invention, I claim as new:

1. In a device of the character described, the combination of an inclosure provided with a lockable cover and an outlet, a press-head to expel the contents of the inclosure movably fitted into the same and adapted to move under pressure toward said outlet, an inlet for the pressure medium and an independent relief port in the inclosure, a valve whereby this port is controlled, a spring which holds the valve normally closed and means whereby the press-head and this valve are operatively connected in a manner that the valve is caused to open automatically when the press-head has moved through its intended travel and is permitted to close again automatically as soon as the press-head returns.

2. In a device of the character described, the combination of an inclosure provided with a lockable cover and an outlet, a press-head to expel the contents of the inclosure movably fitted into the same and adapted to move under pressure toward said outlet, an inlet for the pressure medium and an independent relief port in the inclosure, a valve whereby this port is controlled, a spring which holds the valve normally closed and a trip normally located in the path of the press-head and in a position whereby, when this latter has moved through its intended path, it acts automatically upon said trip to cause opening of the valve permitting the same to close again automatically as soon as action upon the trip ceases.

3. In a device of the character described, the combination of an inclosure provided with a lockable cover and an outlet, a press-head to expel the contents of the inclosure movably fitted into the same and adapted to move under pressure toward said outlet, an inlet for the pressure medium and an independent relief port in the inclosure, a valve whereby this port is controlled, a spring which holds the valve normally closed, a trip located to project normally through the side of the inclosure into the path of the press-head and means whereby it is operatively connected to the valve mentioned and which means are adapted to move this valve automatically into open position in consequence of actuation of the trip by the press-head after this latter has moved through its intended path, the valve being left free to close again automatically as soon as the press-head returns.

4. In a device of the character described, the combination of an inclosure provided with a lockable cover and an outlet, a press-head to expel the contents of the inclosure movably fitted into the same and adapted to move under pressure toward said outlet, an inlet for the pressure medium and an independent relief port in the inclosure, a valve whereby this port is controlled, a spring which holds the valve normally closed, a trip seated in the side of the inclosure and projecting normally into the path of the press-head and a lever in operative connection therewith and with the valve mentioned and whereby this latter is caused to open automatically when the trip is actuated by the press-head after this latter has moved through its intended path, the valve being free to close again automatically as soon as the press-head returns.

5. In a device of the character described, the combination of an inclosure provided with a lockable cover and an outlet, a press-head to expel the contents of the inclosure movably fitted into the same and adapted to move toward said outlet, an inlet to this inclosure to admit a pressure medium to move the press head, a valve which controls this inlet, an independent relief port in the inclosure, a valve which controls it, means whereby the two valves are connected to move together and in a manner that when one valve is caused to open, the other closes, a trip located to project normally into the path of the press-head so as to be actuated thereby when this latter has moved through its intended path, means operatively connecting the trip with both valves to effect automatically their simultaneous movement in one direction, and a spring to return them again automatically to their original position.

In testimony whereof, I hereunto affix my signature in the presence of two witnesses.

CHARLES NAEGELEN.

Witnesses:
C. SPENGEL,
T. LE BEAU.